United States Patent [19]

Farmos

[11] Patent Number: 5,496,051
[45] Date of Patent: Mar. 5, 1996

[54] APPARATUS FOR PROPELLING A MANUALLY-POWERED CYCLE

[76] Inventor: George T. Farmos, 5733 Crestmont Ave., Livermore, Calif. 94550

[21] Appl. No.: 228,509

[22] Filed: Apr. 15, 1994

[51] Int. Cl.$^6$ ............................ B62M 1/04; B62M 1/06
[52] U.S. Cl. .................... 280/252; 280/251; 280/255
[58] Field of Search .................... 280/253, 255, 280/256, 257, 258, 252, 251; 74/594.1, 594.3

[56] References Cited

U.S. PATENT DOCUMENTS

| | | | |
|---|---|---|---|
| 602,230 | 4/1898 | Conselyea | 74/143 |
| 849,342 | 4/1907 | Swinbank | 280/255 X |
| 3,661,404 | 5/1972 | Bossaer | 280/255 |
| 4,019,230 | 4/1977 | Pollard | 280/214 |
| 4,169,609 | 10/1979 | Zampedro | 280/252 X |
| 5,104,137 | 4/1992 | Kilts | 280/255 |
| 5,121,654 | 6/1992 | Fasce | 280/255 X |
| 5,236,211 | 8/1993 | Meguerditchian | 280/252 X |
| 5,335,927 | 8/1994 | Islas | 280/255 |

Primary Examiner—Margaret A. Focarino
Assistant Examiner—F. Zeender
Attorney, Agent, or Firm—Thomas R. Lampe

[57] ABSTRACT

Apparatus for propelling a manually-powered cycle including first and second pedals which move along spaced, linear paths of movement. The pedals are connected to the drive wheel of the cycle through elongated flexible transmission elements which wrap about rotatable crank members used to drive the cycle.

10 Claims, 5 Drawing Sheets

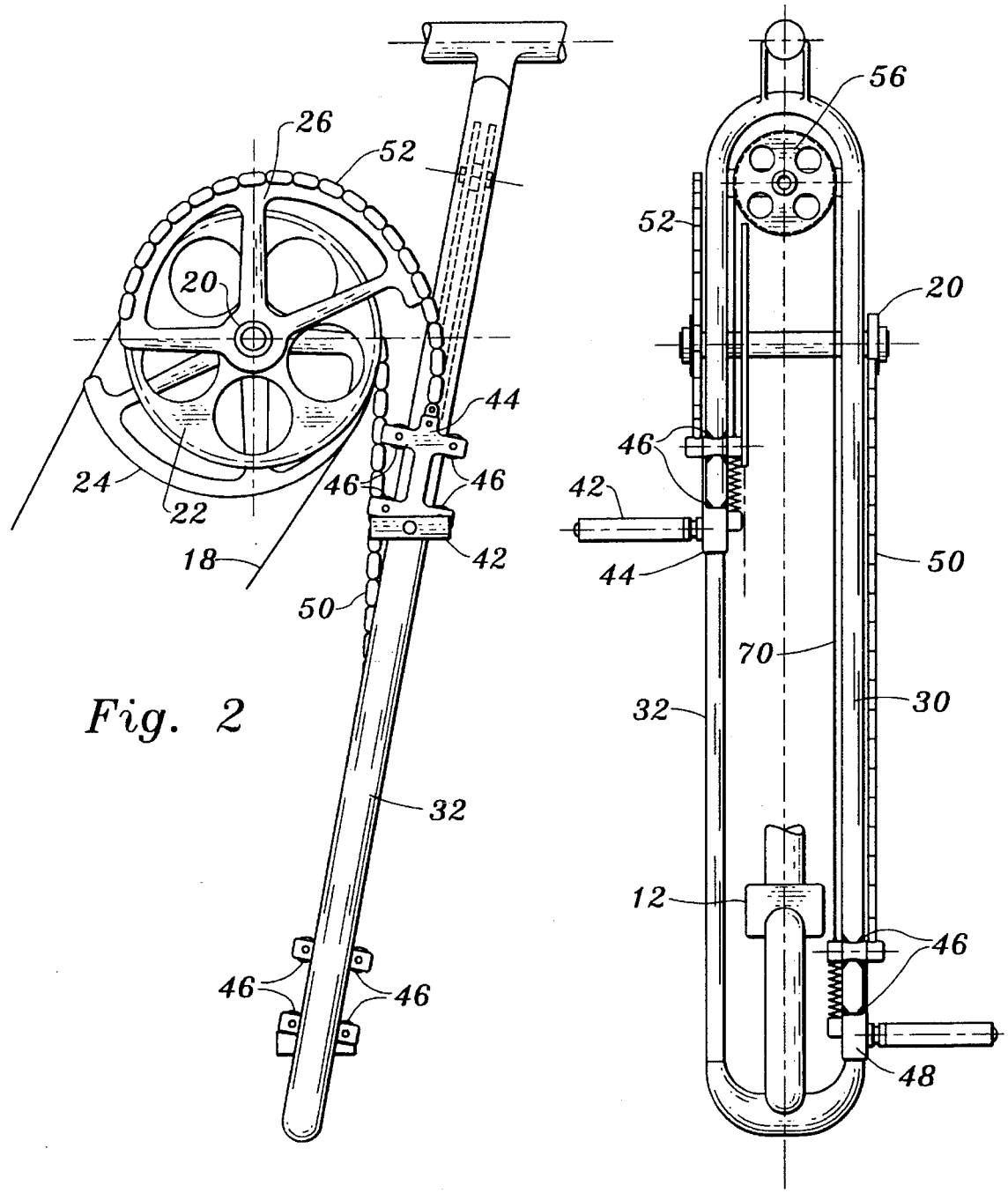

APPARATUS FOR PROPELLING A MANUALLY-POWERED CYCLE

TECHNICAL FIELD

This invention relates to manually-powered cycles such as bicycles. More particularly, the invention is directed to apparatus for propelling a cycle through force exerted by a rider on pedals thereof.

BACKGROUND ART

Many propulsion and transmission systems are known in the prior art for use with bicycles and other manually-powered cycles. Most commonly, the cycle is propelled by foot pedals which are connected through suitable transmission means to one or more of the cycle wheels, the pedals locating about a central axis passing through the cycle frame and moving along a circular path of movement about the axis when pumped by the rider.

One of the problems with the conventional pedalling arrangement just described is that of inefficient and uneven distribution of torque force applied to the pedals. It will be appreciated that maximum force from the pedal to the wheel being driven occurs when the crank arm to which the pedal is attached is essentially horizontal. Power applied to the cycle transmission is at its lowest value when the crank arm supporting the pedal is at or near vertical. Also, of course, the force applied to the transmission of the cycle continuously varies as the pedal traverses its circular path between the crank arm vertical and horizontal positions. This fluctuation of torque force applied to the cycle drive wheel substantially reduces the overall efficiency of the manually powered cycle drive.

Applicant is aware of the following United States patents: U.S. Pat. Nos. 602,230, issued Apr. 12, 1898, 3,66,1,404, issued May 9, 1972, and 4,019,230, issued Apr. 26, 1977, all of which relate to propelling mechanisms for manually powered bicycles.

U.S. Pat. No. 602,230 discloses a propelling mechanism wherein the pedals are connected to crank arms which rotate about a common pivot. The pedals essentially move in circular paths of movement, although some variance or deviation from these strictly circular paths results from the fact that the pedals can slide axially relative to the crank arms. The pedals do not traverse a complete circle but rather a segment thereof. The crank arms alternately pivotally move up and down relative to the central axis and operate a ratchet mechanism which drives the drive wheel of the bicycle.

U.S. Pat. No. 3,661,404 also teaches the idea of employing alternating-motion pedals, the movement of which is converted by a particular chain means into a rotating motion which is applied to the driving wheel of the bicycle. The two pedals of the bicycle are mounted on the free ends of two control levers arranged on either side of a frame, each lever pivoting about a substantially horizontal first shaft attached to the rear bicycle fork in parallel relationship to and adjacent to the driving wheel axle. Each lever is hung from one free end of a drive chain cooperating with two freewheeling pinions mounted on a second shaft of the bicycle frame.

U.S. Pat. No. 4,019,230 discloses a reciprocating powered bicycle wherein pedals move along a path comprising a segment of a circle, the pedals being connected to crank arms rotating about a common axis through the bicycle frame. The pedals drive the bicycle drive chain through a roller clutch and ratchet arrangement. A rocker arm connected to the pedal crank arms operates to pull one pedal up as the other pedal is depressed by the rider.

DISCLOSURE OF INVENTION

The present invention relates to apparatus for propelling a manually-powered cycle wherein the pedals associated with the cycle apply propelling forces to the cycle drive wheel which are of a continuously high useful value during the entire range of pedal travel. With the present invention, the lever arm or crank arm length is kept at a maximum desired value at all points of operation. The force may be essentially uniform throughout the path of the movement of the pedal being depressed by the rider. If desired, the apparatus may be readily adapted or customized to fit the specific needs of a rider by varying the forces which can be applied to the drive wheel of the cycle.

The present invention relates to apparatus for propelling a manually-powered cycle including a frame and at least two cycle wheels for supporting the frame. The apparatus includes a first pedal and a second pedal. Mounting means mounts the first and second pedals for reciprocating movement relative to the frame between retracted and extended positions and the mounting means restricts reciprocal movement of the first and second pedals between the retracted and extended positions to spaced, linear paths of movement.

Transmission means is operatively associated with the first and second pedals and at least one cycle wheel to transfer power alternately from the first and second pedals to the at least one cycle wheel to impart torque to the at least one cycle wheel during alternate depression of the pedals from their retracted positions to their extended positions by a cycle rider and during movement of the first and second pedals along the spaced, linear paths of movement.

The transmission means includes a first flexible transmission element connected to the first pedal, a second flexible transmission element connected to the second pedal, a first rotatable crank member having a curved outer surface in supporting engagement with the first flexible transmission element, and a second rotatable crank member having a curved outer surface in supporting engagement with the second flexible transmission element.

The transmission means additionally includes clutch means operatively associated with the first rotatable crank member and with the second rotatable crank member. The transmission means further includes a drive sprocket and a third flexible, transmission element interconnecting the drive sprocket and the at least one bicycle wheel. The first rotatable crank member and the second rotatable crank member are alternately reciprocally rotatable by the first and second pedals through the first and second flexible transmission elements and responsive to movement of the first and second pedals between the retracted and extended positions along the spaced, linear paths of movement to operate the clutch means and cause the drive sprocket to rotate in a predetermined direction.

Other features, advantages, and objects of the present invention will become apparent with reference to the following description and accompanying drawings.

BRIEF DESCRIPTION OF DRAWINGS

FIG. 2 is a sectional, side view illustrating selected operative components of the present apparatus;

FIG. 3 is a frontal, segmental view illustrating the components of FIG. 2;

BEST MODE FOR CARRYING OUT THE INVENTION

Figure 1:
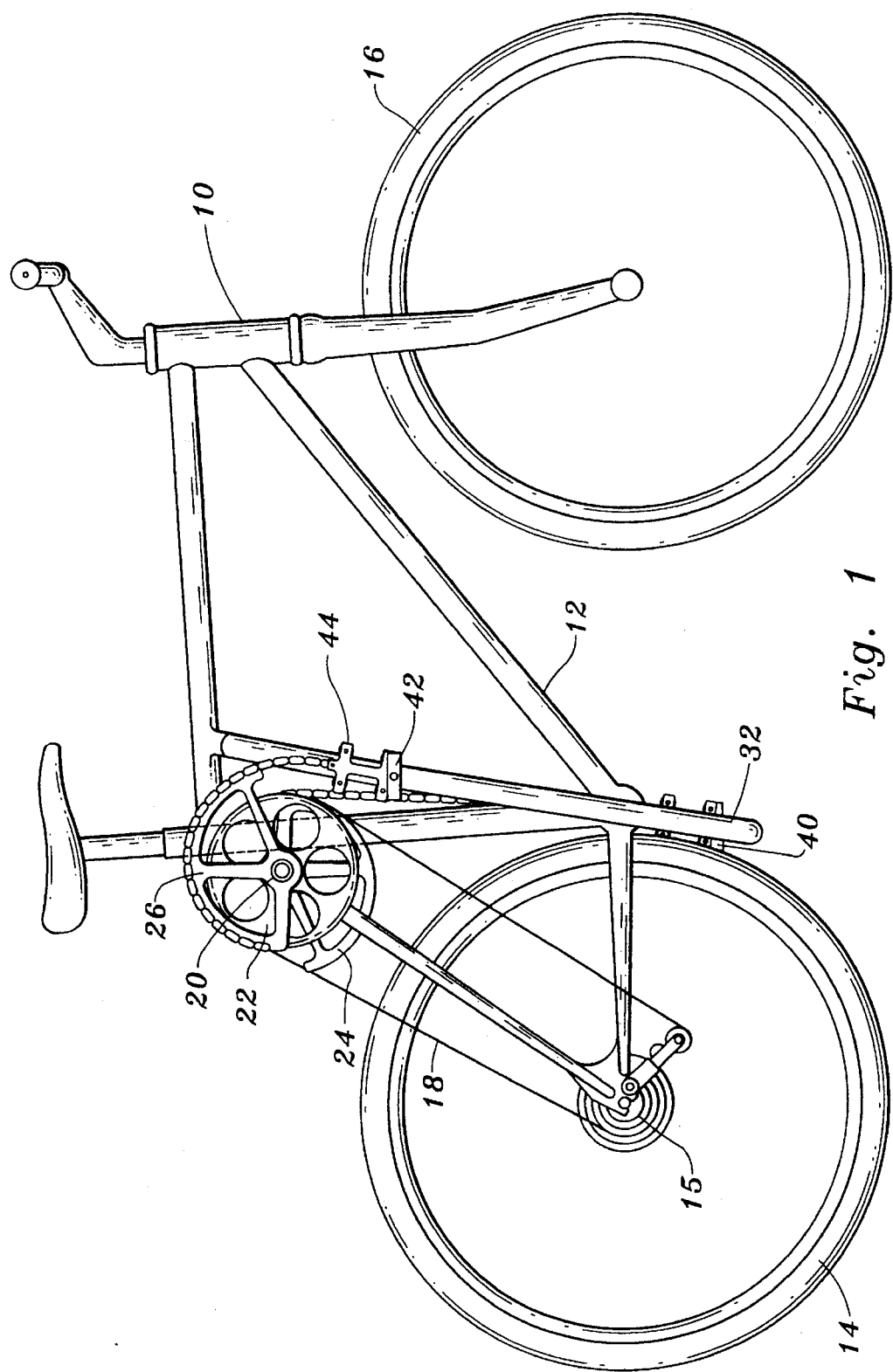
FIG. 1 is a side view of a bicycle incorporating apparatus constructed in accordance with the teachings of the present invention.

Referring now to the drawings, a bicycle 10 includes a frame 12 and wheels 14, 16. Wheel 14 is driven by a chain 18 connected to a conventional multi-sprocket gear assembly 15.

Figure 4:
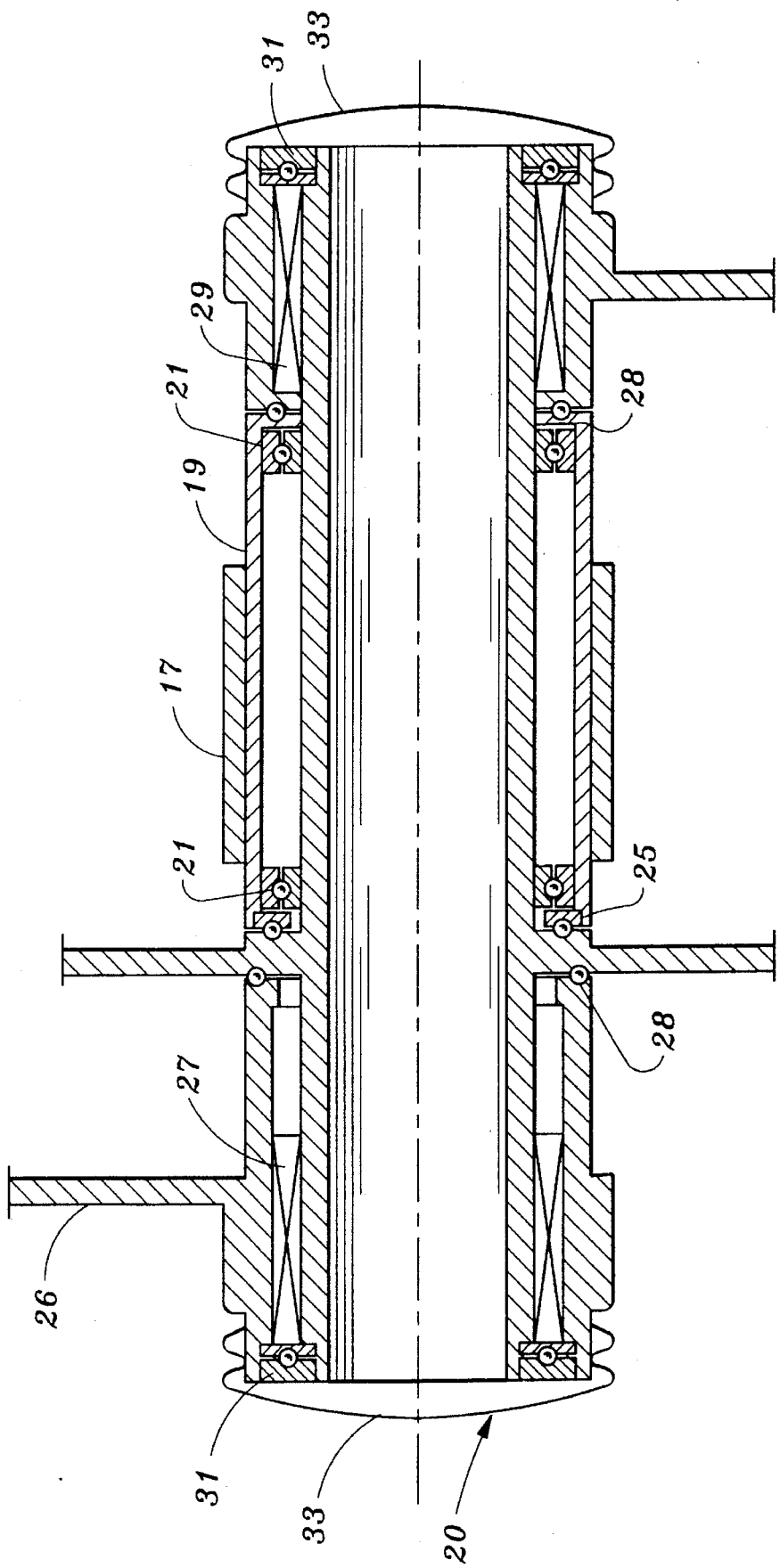
FIG. 4 is a somewhat diagrammatic, cross-sectional view of structure including a clutch and bearing assembly employed in apparatus constructed in accordance with the teachings of the present invention.

Connected to frame 12 by a clamp 17 (FIG. 4) is an assembly 20. Assembly 20 includes a housing 19 and bearings 21. Rotatably journaled within housing 19 and bearings 21 is a sprocket shaft 23. A drive sprocket or control drive element 22 is affixed to sprocket shaft 23 and extends adjacent to and outwardly of the housing 19. A thrust bearing 25 is located between the housing and drive sprocket. Drive sprocket 22 is of circular configuration and has teeth about the outer periphery thereof which engage chain 18. Central drive element 22 is rotatable to drive the wheel 14 through the intermediate chain 18.

Located at the opposed ends of the assembly 20 are a first rotatable crank member 24 and a second rotatable crank member 26, the crank members being coaxial with the sprocket shaft 23. As viewed in FIG. 1, clockwise rotation of either first rotatable crank member 24 or second rotatable crank member 26 will result in corresponding rotation of the central drive element, the chain 18 and wheel 14.

Crank members 24 and 26 are journaled on clutch and bearing assemblies 27, 29, respectively. The clutch and bearing assemblies can be of conventional construction and are illustrated diagrammatically. Rotation of the respective crank members 24, 26 clock-wise (as viewed in FIG. 1) will cause corresponding rotation of sprocket shaft 23 through the clutches of assemblies 27, 29. However, the clutches will allow ready counter-clockwise rotation of the crank members 24 and 26.

Thrust bearings 28 and 31 rotatably interconnect crank members 24, and 26 to the rest of the assembly 20. End caps 33 cover the ends of the assembly.

Frame 12 of bicycle 10 includes two spaced, parallel straight frame members 30, 32. A pedal 40 is mounted for movement along frame member 30 between an upper or retracted position and a lower or extended position. Pedal 42 is similarly mounted relative to frame member 32 (See FIG. 3). Each pedal is part of a pedal assembly which includes a support frame 44 and a plurality of rollers 46 attached to the support frame and rotatable both relative thereto and relative to the particular frame member of the bicycle frame with which the pedal support frame is associated to smoothly guide pedal movement along spaced, linear paths of movement. Nylon sleeves (not shown) may be employed in the pedal assemblies to facilitate relative movement between the support frames and frame members.

Connected to each pedal through its related pedal support assembly is an elongated flexible transmission element in the form of a chain having links. In the arrangement illustrated, flexible transmission element 50 is operatively associated with pedal 40 and flexible transmission element 52 is operatively associated with pedal 42.

The ends of the flexible transmission elements 50, 52 remote from the pedals are affixed in any desired manner to the crank members 24, 26.

When the pedal to which it is connected is at its uppermost position the flexible transmission element will be almost entirely in engagement with the outer surface of its associated rotatable crank member. When, however, the pedal is at its lowermost position, the associated flexible transmission element will be almost completely unwound from the connected crank member and extend downwardly therefrom along its respective frame member. Such "unwinding" imparts rotation to the central drive element or drive sprocket 22 as previously described, it being understood that the pedals 40 and 42 will be alternately depressed to cause such rotation and thus drive the bicycle.

A sprocket 56 is disposed between frame members 30, 32 at the upper ends thereof. A chain 70 extends about the upper portion of the sprocket 56 and is connected at its ends to the pedal assemblies. Downward movement of one pedal will thus serve to raise the other pedal, such action taking place on an alternate basis.

It will be noted that the crank members have curved outer surfaces eccentrically disposed relative to the common axis about which the rotatable crank members rotate. Thus, the locations of the flexible transmission elements 50, 52 relative to the common axis of rotation will vary as the rotatable crank members rotate in response to movement of the pedals along their spaced, linear paths of movement. This enables the effective lever-arm length of the cranking mechanism to be kept at a maximum desired value at all points of operation and enables the useful torque-making force to be at its maximum during the entire range of pedal travel. By replacing the rotatable crank members with rotatable crank members of a different configuration, the rotary lever-arm shape can be customized to fit the specific needs of the rider.

Figure 6:
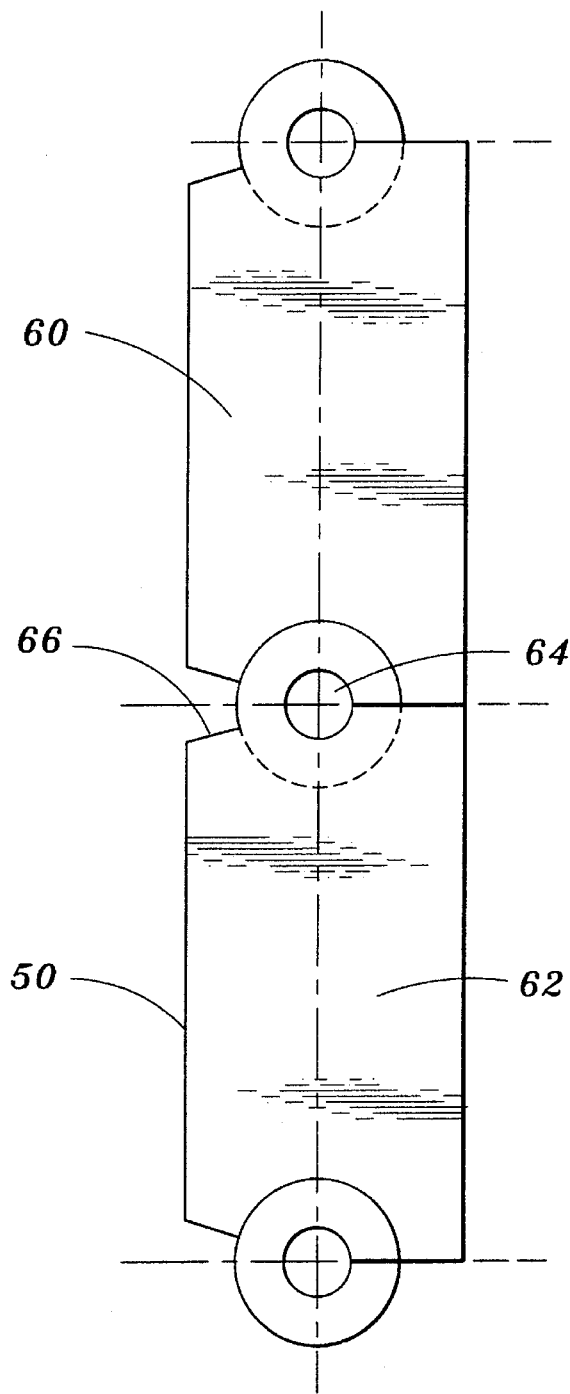
FIG. 6 is a greatly enlarged, frontal view of links of a flexible transmission element.
Figure 7:
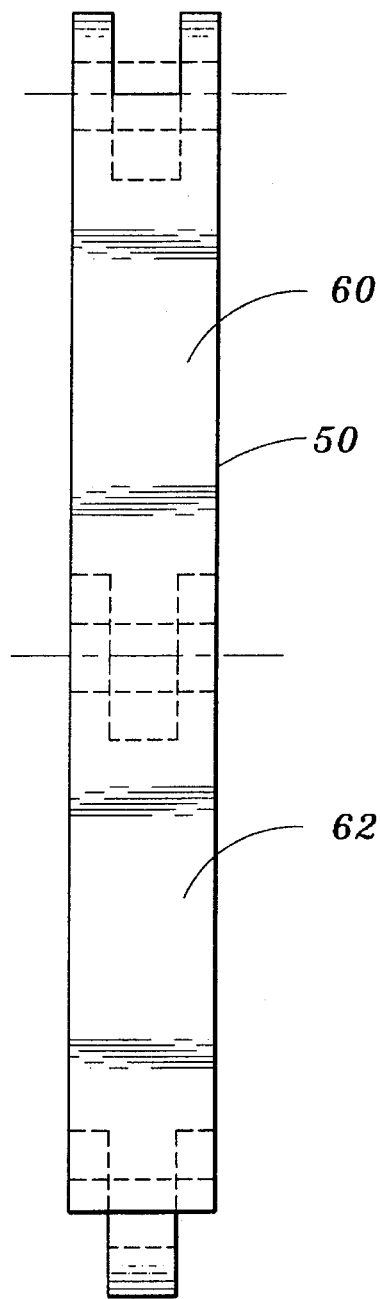
FIG. 7 is a greatly enlarged, side view of the links of FIG. 6.

The flexible transmission elements are so constructed that depression of one pedal will cause the other pedal to push upwardly against its respective flexible transmission element and cause the flexible transmission element itself to push against the non-driving crank member, rotate it counter-clockwise (as viewed in FIG. 1) and rewind the flexible transmission element about the crank member. FIGS. 6 and 7 show two connected links 60, 62 of flexible transmission element 50. The links are rotatable about a common link pin 64.

The link ends are so configured as to be flat and abutting at one side of pin 64 and diverging to form a notch 66 at the other side thereof. This will allow the links to bend about the crank members but otherwise will maintain the links in a generally straight alignment. This will allow the flexible transmission elements to push against and rotate the respective crank members when pushed upwardly by a pedal.

Figure 5:
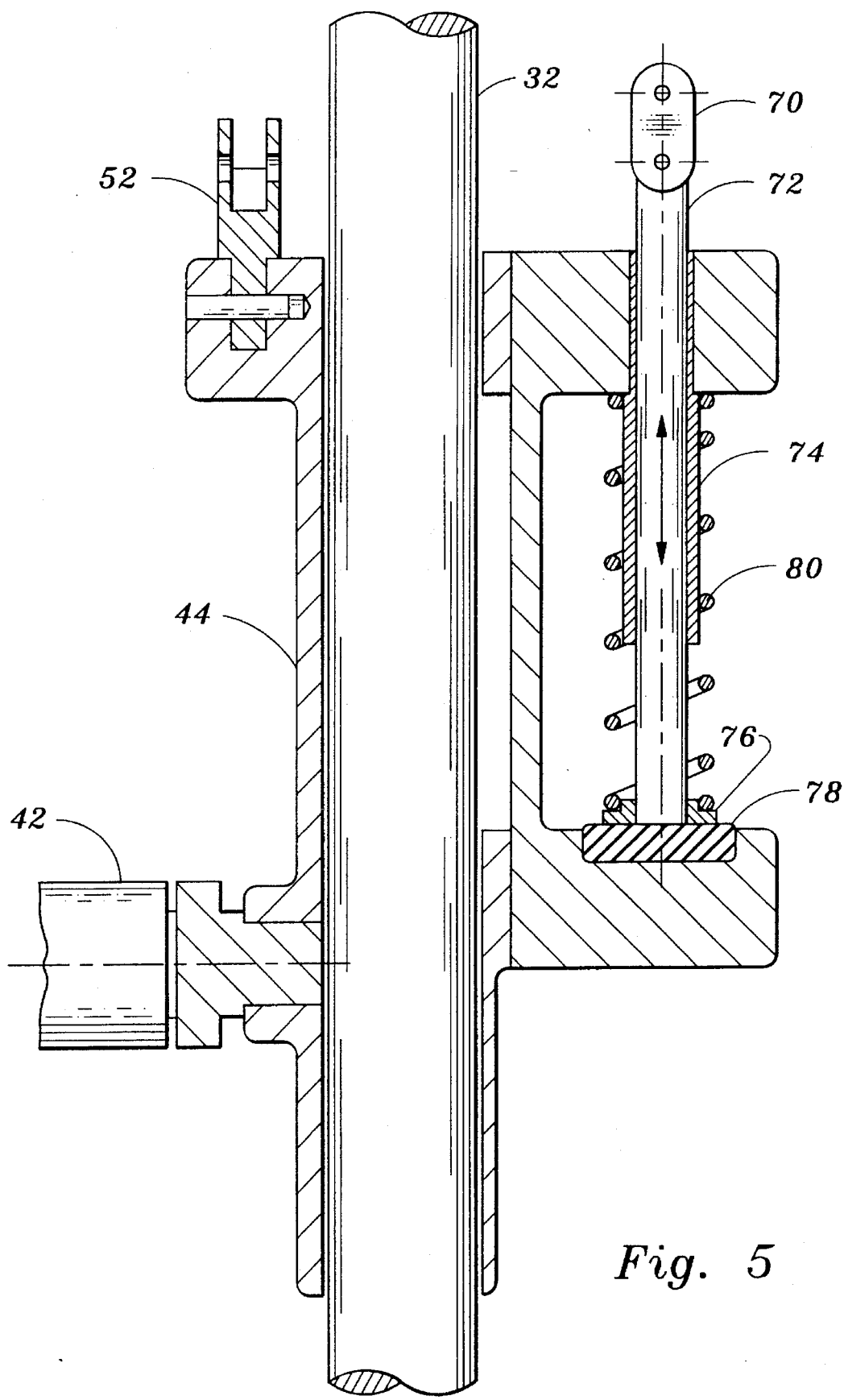
FIG. 5 is a fragmentary, enlarged, cross-sectional view illustrating structural details of pedal guide means and an interconnected flexible transmission element.

Referring now to FIG. 5, one of the distal ends of chain 70 is shown. An end link of chain 70 is connected to a shaft 72 passing through an aperture in support frame 44. The shaft 72 is free to slide within a sleeve 74 affixed to the support frame 44 within the aperture. A nut 76 is secured to the shaft end. The nut engages a resilient bumper element 78 embedded in support frame 44. A coil compression spring bears against both the nut 76 and the support frame 44. A similar arrangement is provided at the other end of chain 70.

The arrangement just described enables an uninterrupted torque to be supplied to the sprocket shaft 23 during pedal transition, increasing efficiency and adding to the rider's comfort.

Before a pedal of the system reaches the bottom stroke limit, the rider pushes on the other pedal to initiate downward movement. The spring and related structure permit this motion. By the time force is taken off the bottom pedal, full force is applied to the top one. In the absence of the spring and related structure, there would have to be one moment during pedal transition wherein the torque force applied to the sprocket shaft would have to be zero. This would manifest itself as an uncomfortable jerking motion and also lower operating efficiency.

I claim:

1. Apparatus for propelling a manually-powered cycle including a frame and at least two cycle wheels for supporting the frame, said apparatus comprising in combination:

a first pedal;

a second pedal;

mounting means mounting said first and second pedals for reciprocating movement relative to said frame between retracted and extended positions and said mounting means restricting reciprocal movement of said first and second pedals between said retracted and extended positions to spaced, linear paths of movement; and transmission means operatively associated with said first and second pedals and at least one cycle wheel to transfer power alternately from said first and second pedals to said at least one cycle wheel to impart torque to said at least one cycle wheel during alternate depression of said pedals from said retracted positions to said extended positions by a cycle rider and during movement of said first and second pedals along said spaced, linear paths of movement, said transmission means including a double-ended first flexible transmission element connected to said first pedal at one of the ends thereof, a second double-ended flexible transmission element connected to said second pedal at one of the ends thereof, a first rotatable crank member having a curved outer surface connected to and in supporting engagement with said first flexible transmission element at the other of the ends thereof remote from said first pedal, and a second rotatable crank member having a curved outer surface connected to and in supporting engagement with said second flexible transmission element at the other of the ends thereof remote from said second pedal, said pedals upon depression thereof and movement thereof toward said extended positions exerting pulling forces on said flexible transmission elements which rotate said rotatable crank members and unwind said flexible transmission elements from said rotatable crank members, said rotatable crank members being rotatable about a common axis, and said curved outer surfaces thereof being eccentrically positioned relative to said common axis whereby said first and second flexible transmission elements move closer to said common axis where the flexible transmission elements separate from the curved outer surfaces of said rotatable crank members as said rotatable crank members rotate and said flexible transmission elements unwind from said rotatable crank members in response to depression of said pedals and movement of said pedals along said spaced, linear paths of movement toward said extended positions.

2. The apparatus according to claim 1 wherein said transmission means additionally includes clutch means operatively associated with said first rotatable crank member and with said second rotatable crank member, a drive sprocket, and a third flexible, transmission element interconnecting said drive sprocket and said at least one cycle wheel, said first rotatable crank member and said second rotatable crank member being alternately reciprocally rotatable by said first and second pedals through said first and second flexible transmission elements and responsive to movement of said first and second pedals between said retracted and extended positions along said spaced, linear paths of movement to operate said clutch means and cause said drive sprocket to rotate in a predetermined direction of rotation.

3. The apparatus according to claim 1 additionally comprising pedal interconnecting means interconnecting said first and second pedals and operable to move one of said pedals to the retracted position from the extended position along a linear path of movement when the other of said pedals is depressed by a cycle rider and moves to the extended position from the retracted position along a linear path of movement.

4. The apparatus according to claim 3 wherein said interconnecting means includes an elongated flexible connector element connected to said first and second pedals at spaced locations on said elongated flexible connector element and a sprocket element, said elongated flexible-connector element having two segments extending away from said sprocket element to said first and second pedals.

5. The apparatus according to claim 1 wherein said cycle frame-includes two spaced, parallel, straight frame members, said pedals being mounted on said frame members for movement along said frame members.

6. The apparatus according to claim 5 additionally including guide means attached to said pedals and engaging said frame members to restrict movement of said pedals to said spaced, linear paths of movement.

7. The apparatus according to claim 1 wherein said flexible transmission elements each comprise a plurality of interconnected links and are cooperable with said rotatable crank members to alternately push and pull said rotatable crank members to alternately rotate said rotatable crank members in a clockwise direction and in a counter-clockwise direction responsive to movement of said pedals along said spaced, linear paths of movement.

8. The apparatus according to claim 7 wherein the links of each flexible transmission element define bearing surfaces engageable to resist bending of said flexible transmission elements when said flexible transmission elements push against said rotatable crank members.

9. Apparatus for propelling a manually-powered cycle including a frame and at least two cycle wheels for supporting the frame, said apparatus comprising in combination:

a first pedal;

a second pedal;

mounting means mounting said first and second pedals for reciprocating movement relative to said frame between retracted and extended positions and said mounting means restricting reciprocal movement of said first and second pedals between said retracted and extended positions to spaced, linear paths of movement;

transmission means operatively associated with said first and second pedals and at least one cycle wheel to transfer power alternately from said first and second pedals to said at least one cycle wheel to impart torque to said at least one cycle wheel during alternate depression of said pedals from said retracted positions to said extended positions by a cycle rider and during movement of said first and second pedals along said spaced, linear paths of movement;

pedal interconnecting means interconnecting said first and second pedals and operable to move one of said pedals to a retracted position from an extended position along a linear path of movement when the other of said pedals is depressed by a cycle rider and moves to an extended position from a retracted position along a linear path of movement, said interconnecting means including an elongated flexible connector element connected to said first and second pedals at spaced locations on said elongated flexible connector element and a sprocket element, said elongated flexible connector element having two segments extending away from said sprocket element to said first and second pedals; and biasing means operatively associated with said elongated flexible connector element and said pedals, said elongated flexible connector element having distal ends movable relative to said pedals against bias exerted by said biasing means when the pedals are at extended position.

10. The apparatus according to claim 9 wherein said biasing means comprises a coil spring disposed about each of said elongated flexible connector element distal ends and bearing against said distal ends.

\* \* \* \* \*